United States Patent
Pham et al.

(10) Patent No.: US 11,247,625 B2
(45) Date of Patent: Feb. 15, 2022

(54) CRASH DETECTION SYSTEM

(71) Applicant: Innova Electronics Corporation, Irvine, CA (US)

(72) Inventors: Phuong Pham, Irvine, CA (US); Bach Ngoc Tran Ly, Hi Chi Minh (VN)

(73) Assignee: INNOVA ELECTRONICS CORPORATION, Irvine, CA (US)

( * ) Notice: Subject to any disclaimer, the term of this patent is extended or adjusted under 35 U.S.C. 154(b) by 130 days.

(21) Appl. No.: 16/391,557

(22) Filed: Apr. 23, 2019

(65) Prior Publication Data

US 2020/0339055 A1    Oct. 29, 2020

(51) Int. Cl.
- *B60R 21/0132* (2006.01)
- *B60R 21/015* (2006.01)
- *G07C 5/00* (2006.01)

(52) U.S. Cl.
CPC .... *B60R 21/0132* (2013.01); *B60R 21/01504* (2014.10); *G07C 5/008* (2013.01)

(58) Field of Classification Search
CPC .......... B60R 21/0132; B60R 21/01504; G07C 5/008
See application file for complete search history.

(56) References Cited

U.S. PATENT DOCUMENTS

| | | |
|---|---|---|
| 6,431,593 B1 | 8/2002 | Cooper et al. |
| 6,868,386 B1 | 3/2005 | Henderson et al. |
| 7,119,669 B2 | 10/2006 | Lundsgaard et al. |
| 7,725,216 B2 | 5/2010 | Kim |
| 8,000,843 B2 | 8/2011 | Kim |
| 8,140,358 B1 * | 3/2012 | Ling ................ G07C 5/008 705/4 |
| 8,311,858 B2 | 11/2012 | Everett et al. |
| 8,600,610 B2 | 12/2013 | Bertosa et al. |
| 8,811,008 B2 | 8/2014 | Selkirk et al. |
| 8,892,451 B2 | 11/2014 | Everett et al. |
| 9,183,681 B2 | 11/2015 | Fish |
| D745,029 S | 12/2015 | Gray et al. |
| D746,316 S | 12/2015 | Gray et al. |
| D746,323 S | 12/2015 | Gray et al. |
| 9,213,332 B2 | 12/2015 | Fish et al. |
| D747,734 S | 1/2016 | Gray et al. |
| D749,623 S | 2/2016 | Gray et al. |
| 9,262,254 B2 | 2/2016 | Bertosa et al. |
| 9,292,977 B2 | 3/2016 | Bertosa et al. |
| D757,059 S | 5/2016 | Gray et al. |
| 9,329,633 B2 | 5/2016 | Selkirk et al. |
| D770,462 S | 11/2016 | Gray et al. |
| 9,650,007 B1 | 5/2017 | Snyder et al. |

(Continued)

*Primary Examiner* — Mathew Franklin Gordon
(74) *Attorney, Agent, or Firm* — Stetina Brunda Garred & Brucker

(57) ABSTRACT

A method of determining a critical vehicle event. The method includes receiving vehicle speed data and airbag status data at a remote server. The method further includes deriving, at the remote server, a vehicle deceleration from the vehicle speed data. The airbag status data is analyzed at the remote server to determine whether an airbag on the vehicle has deployed, wherein the analyzing of the airbag status data occurs when a magnitude of the derived vehicle deceleration is above a preset magnitude. The method additionally comprises generating a critical event confirmation signal when the airbag status data reveals deployment of the airbag on the vehicle.

42 Claims, 6 Drawing Sheets

(56) References Cited

U.S. PATENT DOCUMENTS

| | | |
|---|---|---|
| 9,767,625 B1 | 9/2017 | Snyder et al. |
| 9,858,731 B2 | 1/2018 | Fish et al. |
| 9,904,634 B2 | 2/2018 | Case, Jr. et al. |
| 9,916,698 B1 | 3/2018 | Snyder et al. |
| 10,295,333 B2 | 5/2019 | Fish et al. |
| 10,467,906 B2 | 11/2019 | Fish et al. |
| 2002/0198640 A1 | 12/2002 | Gehlot et al. |
| 2005/0128062 A1 | 6/2005 | Lundsgaard et al. |
| 2008/0071428 A1 | 3/2008 | Kim |
| 2010/0191412 A1 | 7/2010 | Kim |
| 2012/0209634 A1 | 8/2012 | Ling et al. |
| 2013/0013347 A1 | 1/2013 | Ling et al. |
| 2014/0300739 A1* | 10/2014 | Mimar ............... G08B 21/06 348/148 |
| 2017/0186054 A1 | 6/2017 | Fish et al. |
| 2017/0210323 A1 | 7/2017 | Cordova et al. |
| 2018/0101775 A1 | 4/2018 | Fish |
| 2018/0126938 A1 | 5/2018 | Cordova et al. |
| 2019/0333289 A1* | 10/2019 | Bayley ............... G07C 5/085 |

\* cited by examiner

| VEHICLE 1 | DECEL MAG. 1 |
|---|---|
| VEHICLE 2 | DECEL MAG. 2 |
| ... | ... |
| VEHICLE N | DECEL MAG. N |

FIG. 3 — 27

| VEHICLE 1 | DTC 1 |
|---|---|
| VEHICLE 2 | DTC 2 |
| ... | ... |
| VEHICLE N | DTC N |

FIG. 4 — 60

| VEHICLE 1 | PID 1 |
|---|---|
| VEHICLE 2 | PID 2 |
| ... | ... |
| VEHICLE N | PID N |

FIG. 5 — 62

| VEHICLE 1 | ALERT 1 |
|---|---|
| VEHICLE 2 | ALERT 2 |
| ... | ... |
| VEHICLE N | ALERT N |

FIG. 6 — 70

CRASH DETECTION SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a system of detecting a critical vehicle event, and more specifically, to a system for remotely and accurately detecting the critical vehicle event based on a multi-factor analysis of vehicle speed and airbag status data to provide a failsafe confirmation of the critical vehicle event.

2. Description of the Related Art

An unfortunate consequence of operating a vehicle is a chance that the vehicle may be involved in a collision or accident. When a vehicle is involved in a collision or accident, injury may be sustained to one or more occupants of the vehicle, and damage may be sustained to the vehicle itself. As such, after an accident, the family or friends of the occupants of the vehicle may be alerted, along with response personnel to provide assistance to those involved in the accident. Furthermore, legal authorities may also be alerted to compile an official report of the accident.

After the accident has occurred, there may be shortcomings in reporting the accident, particularly if the reporting may be required by anyone involved in the accident. For instance, individuals involved in the accident may, at the very least, be shaken by the events that have just transpired. Furthermore, if anyone is injured as a result of the accident, the initial focus for anyone involved in the accident may be tending to those that are injured. If the injuries are severe enough, those involved in the accident may be prevented from contemporaneously reporting the accident. The ability to report an accident may also be limited by the availability of functioning communication hardware at the scene of the accident. Along these lines, in an accident, a driver's smartphone may be damaged, or lost at the scene of the accident, thereby rendering the smartphone useless, and possibly eliminating the ability to call for help.

If there is a delay in reporting the accident, several problems may arise. Perhaps the most critical problem may be the resulting delay in dispatching emergency response personnel to the scene of the accident to attend to anyone who may be injured. Time may be of the essence in treating the injuries, and thus, any delay in reporting the accident may have significant, if not fatal consequences. As such, there is a desire to promptly report an accident.

Another problem that may arise, should there be a delay in reporting the accident, is traffic buildup associated with the accident. If the accident is blocking a traffic lane, traffic may back up in the area of the accident and a tow-truck may be required to clear the lane for emergency vehicles to pass. The longer the vehicle remains in the lane, the worse the traffic buildup may become.

In view of the setbacks noted above, there have been recent advancements aimed at detecting vehicle accidents as they may occur, which may facilitate the reporting of such accidents. For instance, crash detection systems have been developed which utilize the capabilities of smartphone, which may be present in a vehicle, to detect vehicle accidents. The smartphone may include a sensor capable of determining airbag deployment based on a detected change in pressure. However, a vulnerability associated with such accident detection systems is that they may rely solely on the smartphone, whose functionality may become compromised over time. For instance, buildup of moisture, lint, or other environmental objects may render the sensor on the smartphone dysfunctional or unreliable. Accordingly, the liabilities of the smartphone may result in the smartphone failing to detect an accident, or alternatively, generating a false-positive when an accident may not have occurred. The use of the smartphone may also be dependent on the smartphone having sufficient power. If the smartphone battery were to die, the smartphone may not be able to detect an accident. As such, relying solely on a smartphone may not provide reliable accident detection, particularly when the smartphone is require to sense subtle changes in pressure resulting from airbag deployment.

Other vehicle detection systems have been developed which utilize the capabilities of an onboard device which receives vehicle sensor data from a vehicle, from which, the onboard device may be configured to detect an accident. However, the effectiveness of such systems depends on the accuracy of information or data that may be received at the onboard device. For instance, the information or data received by the onboard device may pertain to a prior event, rather than a current event, if the relevant system or sensor is not reset after the prior event. Accordingly, such systems may be vulnerable to false positives, or perhaps, not detecting an accident of certain systems have not been reset and thus, are not providing current data or information.

Accordingly, there is a need in the art for a vehicle crash detection system for remotely and accurately detecting a vehicle crash to allow for an appropriate response to the vehicle crash. Various aspects of the present disclosure address this particular need, as will be discussed in more detail below.

BRIEF SUMMARY

In accordance with one embodiment of the present disclosure, there is provided a method of detecting a critical vehicle event. The method includes receiving vehicle speed data associated with operation of a vehicle. The method further includes deriving a vehicle deceleration from the vehicle speed data. The method further includes receiving airbag status data associated with operation of the vehicle, and comparing the received airbag status data with stored data on a remote server. The method additionally comprises generating a critical event confirmation signal at the remote server, when the derived vehicle deceleration is above a preset magnitude and the comparison of the received airbag status data with the stored airbag status data reveals that the airbag on the vehicle has deployed.

The step of receiving vehicle speed data may include receiving the vehicle speed data at a data acquisition and transfer device plug connectable to a diagnostic port on the vehicle. The step of receiving vehicle speed data may include receiving the vehicle speed data at a handheld communication device.

The step of receiving airbag status data may include receiving an airbag status diagnostic trouble code. In the comparing step, the absence of the airbag status diagnostic trouble code in the stored data and the presence of the airbag status trouble code in the received airbag status data may reveal deployment of the airbag on the vehicle. The method may additionally include the steps of receiving vehicle identification information associated with the vehicle at the remote server, and determining an airbag status diagnostic trouble code based on the received vehicle identification information.

The step of receiving airbag status data may include receiving an airbag status PID. In the comparing step, the absence of the airbag status PID in the stored data and the presence of the airbag status PID in the received data may reveal deployment of the airbag on the vehicle. The method may additionally comprise the steps of receiving vehicle identification information associated with the vehicle at the remote server, and determining an airbag status PID based on the received vehicle identification information.

The method may also include the step of transmitting a hard stop signal from the data acquisition and transfer device to the remote server when the derived vehicle deceleration is above the preset magnitude.

The preset magnitude in the generating step may be at least equal to 4 mph/second. The preset magnitude in the generating step may be at least equal to 7 mph/second. The preset magnitude in the generating step may be at least equal to 11 mph/second. The preset magnitude in the generating step may be at least equal to 65 mph/second.

According to another embodiment, there is provided a system for detecting a critical vehicle event. The system includes a data acquisition and transfer device disposable in communication with a vehicle computer to receive vehicle speed data and airbag status data from the vehicle computer. The data acquisition and transfer device may be operative to derive a vehicle deceleration from the vehicle speed data and generate a hard stop signal when the derived vehicle deceleration is above a preset magnitude. A server is disposable in communication with the data acquisition and transfer device to receive the hard stop signal and the airbag status data therefrom. The server is operative to analyze the airbag status data and generate a critical event confirmation signal when the hard stop signal has been received and the analysis of the airbag status data reveals deployment of the airbag on the vehicle.

The airbag status data may include a diagnostic trouble code. The data acquisition and transfer device may be capable of receiving vehicle identification information associated with the vehicle for transfer to the server, and the server may be capable of determining an airbag status diagnostic trouble code based on the received vehicle identification information. The server may be configured to generate the critical event confirmation signal when the received diagnostic trouble code matches the determined airbag status diagnostic trouble code.

The airbag status data may include parameter id (PID) data. The data acquisition and transfer device may be capable of receiving vehicle identification information associated with the vehicle for transfer to the server, and the server may be capable of determining an airbag status PID based on the received vehicle identification information. The server may be configured to generate the critical event confirmation signal when the received PID matches the determined airbag status PID.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 3 is a deceleration magnitude chart showing different deceleration magnitudes matched with different vehicles;

FIG. 4 is an airbag status DTC chart showing different airbag status DTCs matched with different vehicles;

FIG. 5 is an airbag status PID chart showing different airbag status PIDs matched with different vehicles;

FIG. 6 is an alert database shown different alerts matched with different vehicles;

Common reference numerals are used throughout the drawings and the detailed description to indicate the same elements.

DETAILED DESCRIPTION

Figure 1:
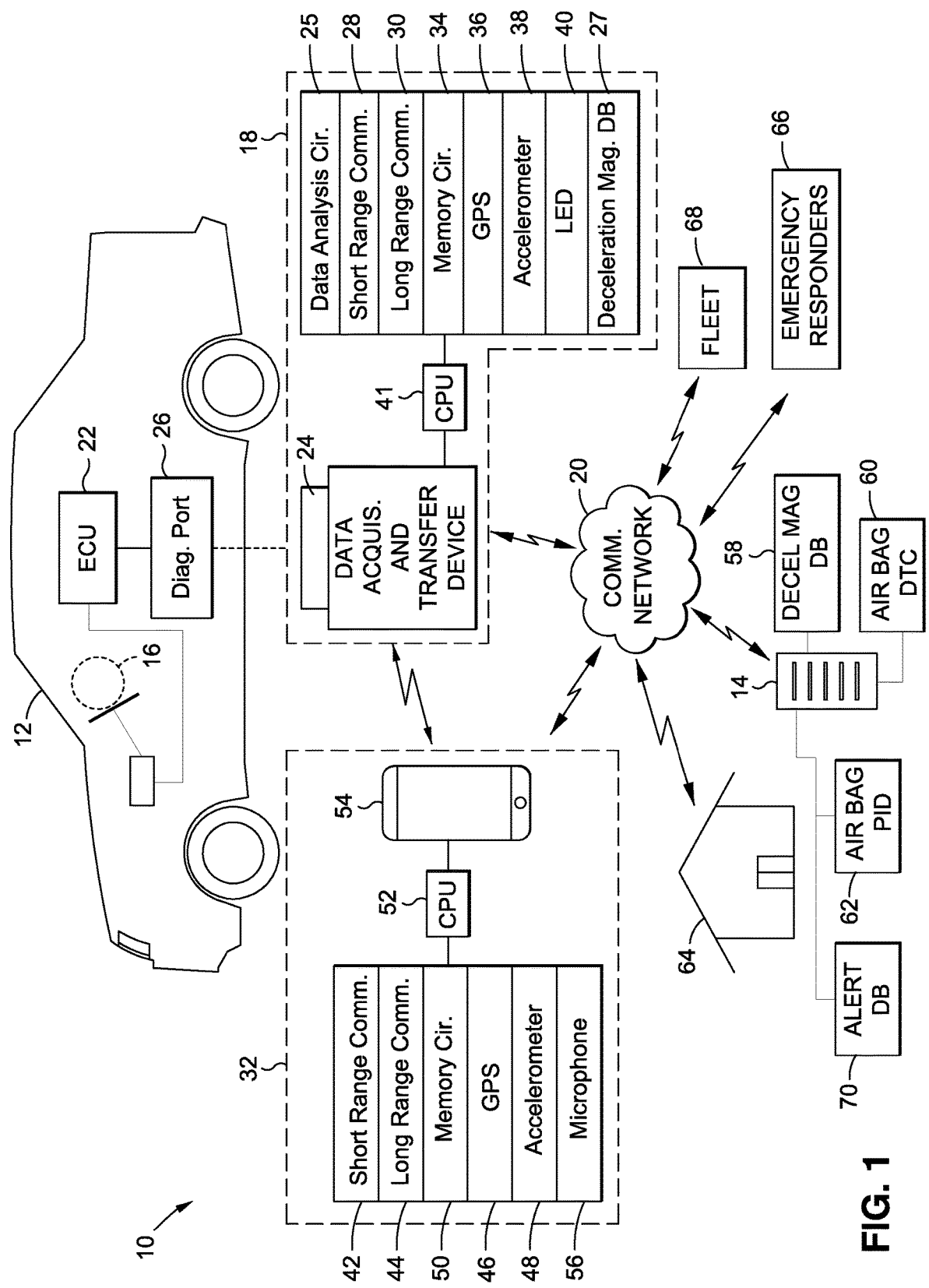
FIG. 1 is a schematic overview of a critical vehicle event detection system.

Referring now to the drawings wherein the showings are for purposes of illustrating a preferred embodiment of the present disclosure, and are not for purposes of limiting the same, FIG. 1 depicts a system 10 for detecting a critical vehicle event, such as a car accident, for a given vehicle 12. The system 10 may provide a failsafe confirmation of the critical vehicle event through a multi-factor analysis of vehicle data, such as airbag status data and vehicle speed data. The system 10 may utilize the capabilities of an onboard data acquisition and transfer device 18, e.g., a diagnostic dongle, for data retrieval and possible diagnostic processing, and a remote server 14 for additional diagnostic processing, as well as possible storage of diagnostic data. The multi-factor assessment may guard against false positives, and thus, may provide results that may be more accurate than systems whose results may be based on a single factor. Furthermore, the system 10 may be structured to allow for remote and accurate identification of a critical vehicle event without requiring input from the driver. Thus, if the driver is injured or incapable of requesting assistance, the remote server 14 may independently identify the critical event and execute one of a number of different commands, such as alerting emergency response personnel, alerting a fleet manager, alerting a family member, or alerting a friend.

According to one embodiment, the data acquisition and transfer device 18 is disposable in communication with the diagnostic server 14 via a communications network 20. The diagnostic data acquisition and transfer device 18 is configured to interface with an electronic control unit (ECU) 22 on a vehicle 12 to retrieve data from the vehicle 12. The term diagnostic data acquisition and transfer device 18 may broadly refer to a diagnostic dongle, code reader, scan tool, smartphone or other hardware, which may include a software application running thereon, to facilitate the retrieval of diagnostic data, or vehicle information from the ECU 22. In the exemplary embodiment, the diagnostic data acquisition and transfer device 18 is embodied as a diagnostic dongle, and thus, the following discussion refers to the diagnostic data acquisition and transfer device 18 as a diagnostic dongle.

The diagnostic dongle 18 may include a data connector 24 connectable with a diagnostic port 26 on the vehicle 12 to facilitate data communication between the ECU 22 and the dongle 18. When the data connector 24 is connected with the diagnostic port 26, the diagnostic dongle 18 may receive vehicle diagnostic information, such as vehicle speed data, from the ECU 22, which may be used to by the diagnostic dongle 18, or other hardware, to derive vehicle deceleration. The dongle 18 may include a data analysis circuit 25 for analyzing the vehicle speed data to derive vehicle deceleration therefrom and generate a hard stop signal when the derived vehicle deceleration exceeds a preset magnitude. The vehicle deceleration may be computed by determining a change in vehicle speed over a given period of time. As such, the speed data retrieved from the vehicle may be time stamped to allow for such derivation.

The diagnostic dongle 18 may also be operative to compare the magnitude of the derived vehicle deceleration to a preset value or magnitude associated with a hard stop. The preset magnitude of the vehicle deceleration may be stored on the diagnostic dongle 18 in a deceleration magnitude database 27, which may include preset deceleration magnitudes correlated with different vehicles. In this regard, each vehicle 12 may not be associated with the same deceleration magnitude corresponding to a hard stop associated with a critical vehicle event. Rather, for lighter vehicles, a hard stop associated with a critical vehicle event may be associated with a deceleration that is higher in magnitude than a heavy vehicle. For instance, with regard to sedans, as well as light and medium trucks, the following decelerations may be associated with and triggered by the following stop conditions: a 7-10 mph change in speed per second (0.32 g-0.46 g) may be associated with a hard stop, a 11-65 mph change in speed per second (0.54 g-2.96 g) may be associated with a very hard stop, a change in speed greater than 65 mph per second (>2.96 g) is likely to be associated with an accident. With regard to heavy trucks, the following decelerations may be associated with the following stop conditions: a 4-6 mph change in speed per second (0.32 g-0.46 g) may be associated with a hard stop, a 7-12 mph change in speed per second (0.54 g-2.96 g) may be associated with a very hard stop, and a change in speed great than 12 mph per second (>2.96 g) is likely to be associated with an accident. It is also contemplated that a user may be able to program the deceleration magnitude that is associated with a hard stop. A hard stop may refer to a significant change in speed, with no airbag deployment, while an accident may include a hard stop in addition to airbag deployment.

Figure 2:
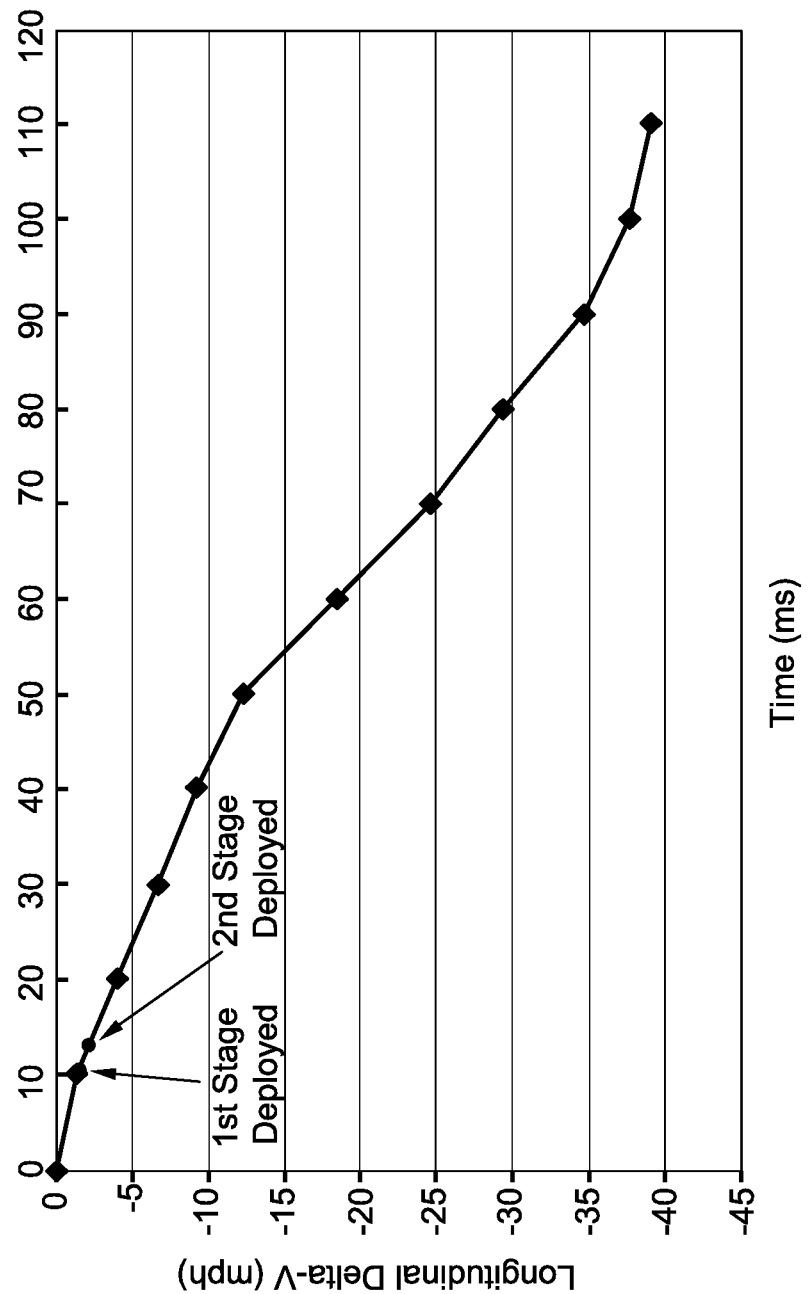
FIG. 2 is a chart showing changes in velocity of time as used to detect a hard stop event.

As noted above, the detection of a critical vehicle event may be based on vehicle deceleration and airbag deployment. In many vehicles, the airbag system is a dual-stage airbag system that may include two inflator modules that are triggered at different deceleration magnitudes. For example, one inflator module may include a 70% charge, while the other inflator module may include a 30% charge. Depending on the severity of the accident, the airbag system may activate one or both inflator modules. FIG. 2 is a graph charting change in speed over time, and denoting first stage deployment of an airbag 16, and then a subsequent second stage deployment of the airbag 16 for a particular vehicle 12. In the embodiment depicted, the first stage airbag deployment occurs when the velocity decreases by about 2 mph within approximately 10 ms, whereas the second stage deployment occurs when the velocity decreases by about 3 mph within approximal 13 ms.

The diagnostic dongle 18 may be able to determine which deceleration magnitude applies to a given vehicle 12 based on the vehicle identification information, e.g., an electronic vehicle identification number, retrievable from the vehicle ECU 22. For instance, the vehicle identification information may identify the year, make, model, and engine of the vehicle, which may be correlated to a preset deceleration magnitude. As yet another alternative, the vehicle identification information may be entered or provided by the user during initial setup of the system, rather than being retrieved from the vehicle. For instance, the user may enter the VIN, or take a picture of the VIN or scan a bar code or QR code associated with the VIN. Any picture, scan, or other electronic information may be analyzed at the server to derive the vehicle information necessary to determine the preset deceleration magnitude for the vehicle 12. As shown in FIG. 3, the deceleration magnitude database 27 may include different vehicles matched with different preset deceleration magnitudes which trigger further analysis by the system 10.

As an alternative to storing the deceleration magnitude database 27 on the dongle 18, it is contemplated that a deceleration magnitude database 58 may be stored on the remote server 14, and may be used during an initial setup for a given vehicle 12 to identify the preset deceleration magnitude that is appropriate for the given vehicle 12. Once the preset deceleration magnitude is identified at the remote server 14, that preset deceleration magnitude may be communicated to the dongle 18 and stored in the local deceleration magnitude database 27.

In addition to receiving vehicle speed data from the vehicle 12, the diagnostic dongle 18 may also be used to receive other diagnostic information from the vehicle 12, such as diagnostic trouble codes (DTCs), parameter id (PID) data, live data, sensor data, vehicle identification information (e.g., electronic vehicle identification number), etc., from the ECU 22, as will be described in more detail below.

With regard to the hardware on the dongle 18, such hardware may facilitate storage, diagnostic processing, and transfer of the data from the dongle 18. Along these lines, the dongle 18 may include a short range wireless communication circuit 28 as well as a long range wireless communication circuit 30. The short range wireless communication circuit 28 may allow for wireless communication between the dongle 18 and other electronic devices in the vehicle 12, such as a user's smartphone 32, which may be used to relay data between the dongle 18 and the server 14. In this respect, the short range wireless communication circuit 28 may communicate via Bluetooth™, WiFi™, or other short-range communication protocols known in the art. The long range wireless communication circuit 30 may be implemented as a cellular network communication circuit that allows for wireless communication with the remote diagnostic server 14. The long-range communication circuit 30 shown in FIG. 1 may allow for wireless communication over the communication network 20. It is contemplated that the long-range communication circuit 30 may require a separate data plan through a wireless cellular communication carrier, and thus, the long-range communication circuit 30 may be optional.

The dongle 18 may additionally include a memory circuit 34 capable of storing data received by the dongle 18. In this regard, the memory circuit 34 may store data temporarily, e.g., buffer data, between the time the data is received at the connector 24 and transmitted by the short or long range communication circuits 28, 30. The memory circuit 34 may also be capable of longer term storage, such as to receive data, e.g., speed data, acceleration data, or airbag status data, that may have been received before, during, and possibly after a critical event.

The dongle 18 may further include a GPS circuit 36, an accelerometer 38, and one or more LEDs 40. The GPS circuit 36 may provide information regarding the location of the dongle 18. The accelerometer 38 may be capable of detecting accelerations/decelerations of the dongle 18, and thus, may provide an alternative, on-board means for detecting deceleration of the vehicle 12. The dongle LED(s) 40 may provide visual alerts to a user, such as that the dongle 18 is operational, i.e., plugged into the diagnostic port 26 and receiving power and/or data from the vehicle 12. A processor 41 may be in communication with the various components on the dongle 18 for executing the functionality on the dongle 18.

As noted above, the diagnostic dongle 18 may interface with the driver's smartphone 32 for uploading vehicle data, as well as a hard stop signal, to the remote server 14. The smartphone 32 may include a short-range communications circuit 42 and a long-range communications circuit 44. The short-range communications circuit 42 may facilitate communication with the dongle 18 via the short-range protocols mentioned above (Bluetooth™, WiFi™), while the long-range communications circuit 44 may communicate via the communications network 20. The smartphone 32 may also include a GPS circuit 46 to determine the location of the smartphone 32, as well as an accelerometer 48 which may be used as an alternative mechanism for detecting changes in acceleration of the vehicle 12, i.e., the change in acceleration of the smartphone 32 may be correlated to change in acceleration of the vehicle 12. The smartphone 32 may also include a memory circuit 50 for storing data, as well as one or more smartphone applications ("apps") thereon. The memory circuit 50 may include flash memory, RAM or other memory hardware known in the art. A processor 52 may be in communication with the various components on the smartphone 32 for executing the functionality on the smartphone 32, including executing instructions that may be associated with any smartphone app stored on the smartphone memory circuit 50. The processor 52 may also be used as an alternative device for analyzing vehicle speed to derive vehicle deceleration for deriving the hard stop signal. In that instance, the vehicle speed data may be received on the smartphone 32 via the dongle 18, or alternatively, the vehicle speed data may be generated using the GPS circuits 46, 36 of the smartphone 32 or the dongle 18.

The driver's smartphone 32 may further include a display screen 54 for displaying data or information related to the vehicle 12. The smartphone 32 may additionally include a microphone 56 to receive verbal commands from the user, as well as to detect ambient sounds associated with the vehicle 12, such as sounds that may be associated with a critical vehicle event. Although the exemplary embodiment includes utilizes a smartphone 32, it is contemplated that other mobile, handheld communication devices may be used in place of a smartphone, such as a tablet computer, a smartwatch, or other compact communication devices, such as an Amazon Echo™.

The diagnostic server 14 is capable of receiving the hard stop signal generated by the dongle 18 or smartphone 32, along with the data and information received from the vehicle 12 and analyzing the information to determine if there has been a critical vehicle event. As used herein, the term "server" refers broadly to the data storage hardware, processing hardware, and any software required to implement the functionalities of the remote server 14 described herein. The remote diagnostic server 14 may include data storage units, processors, computers, transceivers, etc.

When the magnitude of the derived vehicle deceleration is determined to be less than the preset magnitude associated with the vehicle 12, the system 10 continues to operate as normal with vehicle data being received by the dongle 18. The vehicle data may also be continuously uploaded and stored on the server 14. However, when the derived vehicle deceleration is determined to be greater than or equal to the preset magnitude, the hard stop signal is generated and transmitted to the remote server 14. Upon receipt of the hard stop signal, the remote server 14 proceeds to the second stage of the analysis including an analysis of airbag status data. The analysis of the airbag status data may include a comparison, at the server 14, of airbag status data before the detected deceleration and after the detected deceleration to determine whether a change in the airbag status data has occurred.

The vehicle diagnostic data may include airbag status data in the form of a diagnostic trouble code (DTC), which may be specific to the particular vehicle. As such, the server 14 may be capable of determining the presence or absence of a DTC indicative of airbag deployment based on an evaluation of the received diagnostic data and the received vehicle identification information. As shown in FIGS. 1 and 4, the server 14 may include an airbag DTC database 60, which correlates different vehicles with different airbag status DTCs. Once the specific airbag status DTC for a specific vehicle is determined, the server 14 may analyze diagnostic data received at the server 14 to identify whether the specific airbag status DTC is included in the received diagnostic data. If the specific airbag status DTC is included in the received diagnostic data, the server 14 may be configured to generate a critical event confirmation signal. In this regard, the server 14 may perform a comparison of previous diagnostic data received at the server 14 prior to receipt of the hard stop signal, with diagnostic data received at the server 14 concurrently or after receipt of the hard stop signal. The server 14 may conclude that the airbag has been deployed, and thus generate a critical event confirmation signal, when the previous diagnostic data does not include the specific airbag status DTC, and the diagnostic data received concurrently or after receipt of the hard stop signal does include the specific airbag status DTC. If there is no difference in the airbag status data received prior to the hard stop signal with the airbag status data received concurrently or after receipt of the hard stop signal, the server 14 may conclude that the airbag has not deployed.

As an alternative to using the DTCs as the airbag status data, in another embodiment, the airbag status data may include parameter id (PID) data. As such, the server 14 may be capable of determining the specific airbag status related PID data, within the received diagnostic data, based on the received vehicle identification information. As shown in FIGS. 1 and 5, the server 14 may include an airbag PID database 62, which correlates different vehicles with associated airbag status PIDs. Once the specific airbag status PID data is determined, the server 14 may analyze diagnostic data received at the server 14 to identify whether the specific airbag status PID data is included in the received diagnostic data. If the specific airbag status PID data is included in the received diagnostic data, and the substance of that PID data indicates that an airbag has been deployed, the server 14 may be configured to generate the critical event confirmation signal. In this regard, the server 14 may conclude that the airbag has been deployed, and thus generate the critical event confirmation signal, when the previous diagnostic data does not include the specific airbag status PID data, and the diagnostic data received concurrently or after receipt of the hard stop signal does include the specific airbag status PID data. If there is no difference in the airbag status data received prior to the hard stop signal with the airbag status data received concurrently or after receipt of the hard stop signal, the server 14 may conclude that the airbag has not deployed.

It is also contemplated that in other embodiments, the server 14 may be configured to base the critical vehicle event determination on a combined analysis of DTCs and PID data. In this regard, before the critical event confirmation signal is generated, the server 14 may require that the presence of a vehicle specific airbag status DTC be confirmed by the presence of vehicle specific airbag status PID data confirming airbag deployment data received from the vehicle 12.

When the airbag status data reveals that the airbag 16 has deployed, the remote server 14 concludes that a critical vehicle event has occurred, which may cause the server 14 to execute one or more pre-programmed functions stored on the server 14 in a function database. For instance, the pre-programmed functions may include generating and transmitting an alert to an electronic address 64 associated with a family member (e.g., email, text message, voice message), emergency responders, and/or a fleet manager 68, etc. The server 14 may include an alert database 70 having different vehicles matched with different alerts that are to be made, or other functions that are to be executed, when the server 14 detects a critical event for a given vehicle 12.

Figure 7:
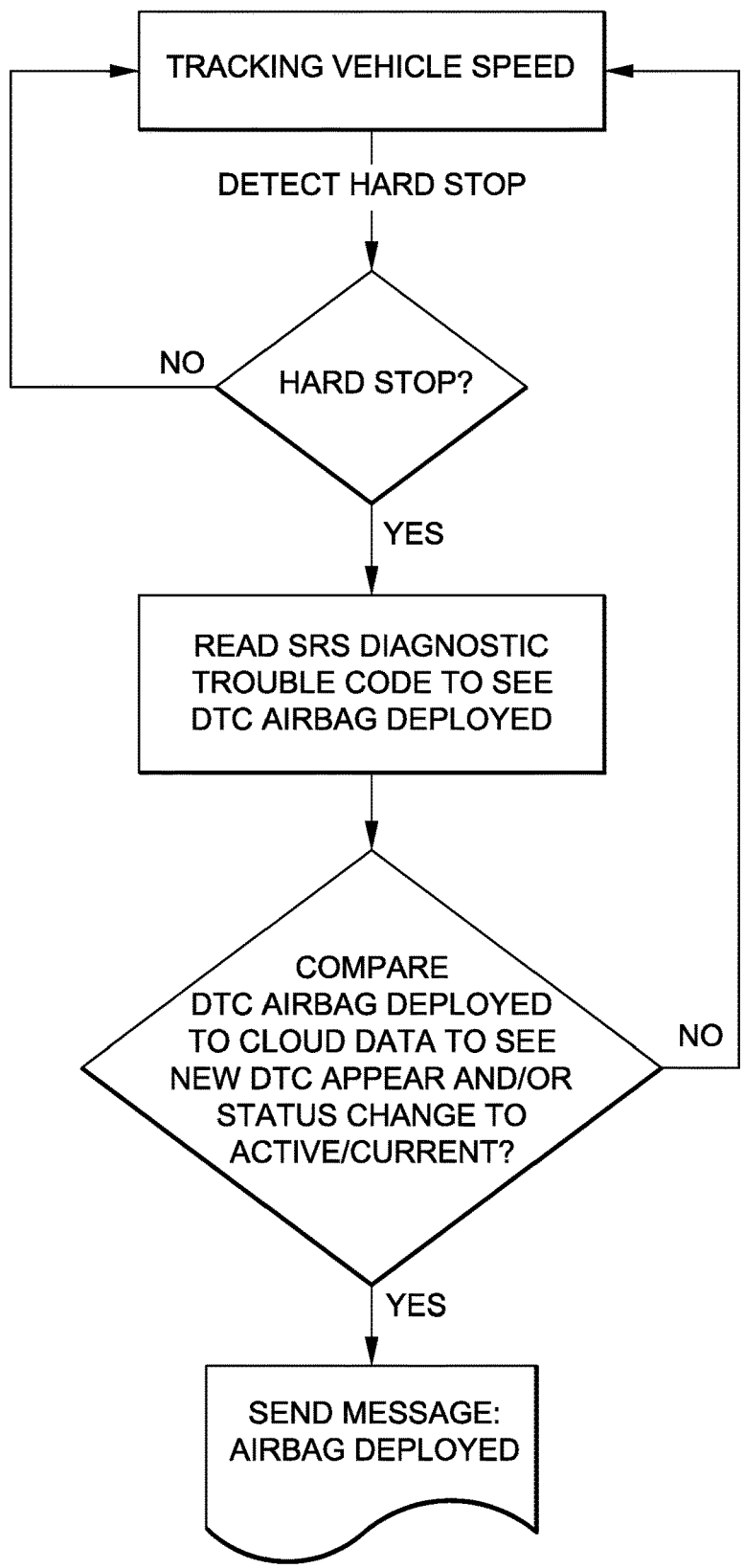
FIG. 7 is a flow chart of a critical vehicle event detection methodology comprising an analysis of airbag deployment DTCs.
Figure 8:
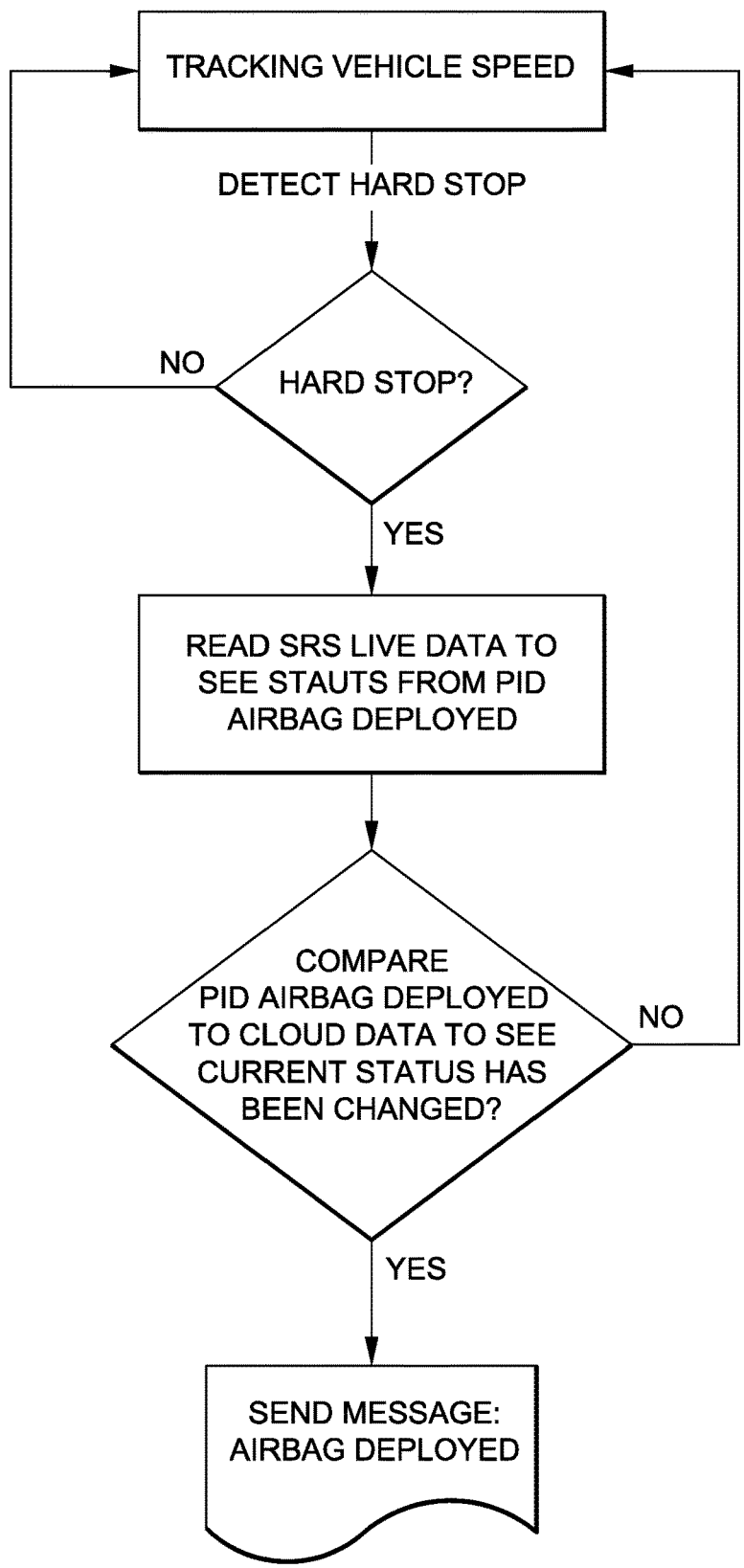
FIG. 8 is a flow chart of a critical vehicle event detection methodology comprising an analysis of a deployment PID.
Figure 9:
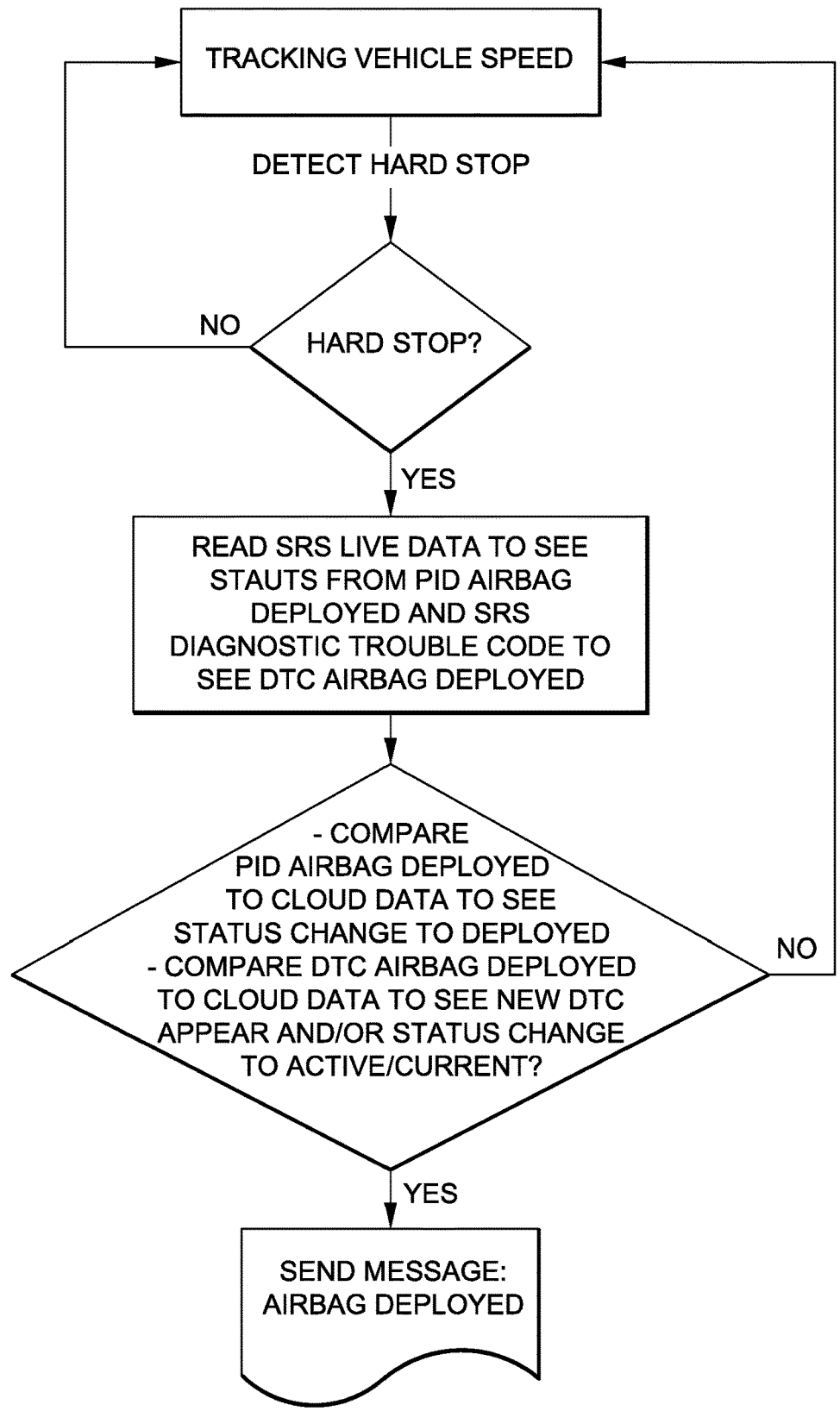
FIG. 9 is a flow chart of a critical vehicle event detection methodology comprising an analysis of a deployment PID and airbag deployment DTCs.

With the basic structure of the system 10 described above, and with reference to FIGS. 7-9, the following discussion focuses on an exemplary use of the system 10. In the vehicle 12, a driver plugs the dongle 18 into the diagnostic port 26 on the vehicle. The dongle 18 may also be paired or synched with the driver's smartphone 32. Once connected, the dongle 18 may poll the ECU 22 to determine a communication protocol associated with the ECU 22. Once a communication link has been established between the ECU 22 and the dongle 18, the dongle 18 may receive vehicle identification information from the ECU 22, which is uploaded to the server 14, either via the driver's smartphone 32, or via the long-range communication circuit 30 on the dongle 18. The server 14 may analyze the vehicle identification information to identify a year, make, model and engine of the vehicle 12 for determining a preset vehicle deceleration magnitude as well as airbag status data definitions associated with the vehicle 12.

As the vehicle 12 is driven, the dongle 18 receives vehicle data from the ECU 22 throughout the course of a trip. The dongle 18 may receive vehicle data substantially continuously, e.g., every 100 ms-1 seconds, and in one particular embodiment, every 200 ms. The vehicle data at least includes vehicle speed data as well as airbag status data. Some, if not all of the vehicle data received at the dongle 18 is uploaded to the server 14 for storage and analysis.

In the first stage of the analysis, the vehicle speed may be analyzed at the dongle 18 to derive a vehicle deceleration and then to compare the derived vehicle deceleration to the preset vehicle deceleration magnitude. When the comparison reveals that the derived vehicle deceleration is greater than or equal to the preset vehicle deceleration magnitude, the dongle 18 generates the hard stop signal, which is communicated to the server 14, which may trigger the second stage of the analysis.

In the second stage of the analysis, the server 14 analyzes the airbag status data to determine if the airbag status data reveals deployment of the airbag 16. If a comparison of diagnostic data received before receipt of the hard stop signal with the diagnostic data received after the hard stop signal shows that the airbag 16 was deployed, either through the presence of a DTC and/or PID data associated with airbag deployment, the system 10 may conclude that a critical vehicle event has occurred. As such, one or more alerts or signals may be communicated based on that determination.

The system 10 advantageously allows for a remote analysis of vehicle data to detect a critical vehicle event, while also minimizing the likelihood that the system will produce a false positive conclusion by establishing the conclusion on two sets of data, i.e., vehicle deceleration and a change in airbag status occurring in time proximate to the vehicle deceleration. The use of the remote server 14 may also allow the system 10 to receive vehicle data from a plurality of dongles 18 for remotely monitoring several different vehicles 12 at once. As such, the system 10 may find particular appeal for organizations or groups having an interest in the safety of several drivers and their related vehicles 12. Such organizations or groups may include, but are not limited to fleet management organizations, car insurance organizations, families having multiple drivers, car dealership, repair shops, etc.

Although the foregoing describes deriving vehicle declaration from the vehicle speed data retrieved from the vehicle 12, it is contemplated that in other embodiments vehicle deceleration may be derived using data from other sources. For instance, the accelerometer 38 on the diagnostic dongle 18 may be used to measure the deceleration of the vehicle 12. The deceleration measured by the dongle 18 may be uploaded to the server 14, and when the deceleration is greater than or equal to the preset deceleration, the method proceeds with the second stage for an analysis of airbag data.

As another alternative, the accelerometer 48 on the smartphone 32 may be used to determine the vehicle's deceleration. For instance, the smartphone 32 may include an application or software stored thereon that causes the smartphone 32 to use the onboard accelerometer 48 when certain conditions are met, e.g., the smartphone 32 becomes paired with the local communication network in the vehicle 12, for monitoring the deceleration of the vehicle 12.

Additional hardware on the smartphone 32 may also be used in evaluating whether a critical vehicle event has occurred. For instance, the microphone 56 may be used to detect sounds that may be associated with a vehicle event. For instance, when a certain decibel level is detected, the system 10 may be configured to send an alert. For more information regarding the use of the smartphone for detecting certain events on the vehicle, please refer to U.S. Pat. No. 9,646,427, entitled A System for Detecting the Operational Status of a Vehicle Using a Handheld Communication Device, the contents of which are expressly incorporated herein by reference.

It is also contemplated that other embodiments may be capable of communicating data from the vehicle without the use of the dongle 18. For instance, the vehicle 12 may include a long range communication circuit capable of uploading diagnostic data to the remote server 14, or alternatively, the ECU 22 may be capable of communicating with the smartphone 32. Accordingly, diagnostic data may be wirelessly communicated from the ECU 22 to the smartphone for diagnostic analysis and/or upload to the remote server 14.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of detecting a critical vehicle event based on multiple vehicle operation factors, the method comprising the steps of:
    receiving vehicle speed data associated with operation of a vehicle;
    deriving a change in vehicle speed from the vehicle speed data;
    comparing the derived change in vehicle speed with a preset magnitude, when the derived change in vehicle speed exceeds the preset magnitude, the derived change in vehicle speed being associated with a critical change in speed;
    receiving airbag status data associated with operation of the vehicle and generated after generation of the received vehicle speed data associated with the critical change in speed;
    comparing the received airbag status data with stored data on a remote server, the stored data on the remote server being generated before generation of the received vehicle speed data associated with the critical change in speed; and
    generating a critical event confirmation signal at the remote server when the derived change in vehicle speed is above the preset magnitude and the comparison of the received airbag status data with the stored data reveals that the airbag on the vehicle has deployed.

2. The method recited in claim 1, wherein the step of receiving vehicle speed data includes receiving the vehicle speed data at a data acquisition and transfer device plug connectable to a diagnostic port on the vehicle.

3. The method recited in claim 1, wherein the step of receiving vehicle speed data includes receiving the vehicle speed data at a handheld communication device.

4. The method recited in claim 1, wherein the step of receiving airbag status data includes receiving an airbag status diagnostic trouble code.

5. The method recited in claim 4, wherein in the comparing step, the absence of the airbag status diagnostic trouble code in the stored data reveals deployment of the airbag on the vehicle.

6. The method recited in claim 1, wherein the receiving airbag status data includes receiving an airbag status PID.

7. The method recited in claim 6, wherein in the comparing step, the absence of the airbag status PID in the stored data reveals deployment of the airbag on the vehicle.

8. The method recited in claim 1, further comprising the step of transmitting a critical change signal from data acquisition and transfer device to the remote server when the derived vehicle deceleration is above the preset magnitude.

9. The method recited in claim 1, wherein the preset magnitude in the generating step is at least equal to 7 mph/second.

10. The method recited in claim 1, wherein the preset magnitude in the generating step is at least equal to 11 mph/second.

11. The method recited in claim 1, wherein the preset magnitude in the generating step is at least equal to 65 mph/second.

12. The method recited in claim 1, wherein the preset magnitude in the generating step is at least equal to 4 mph/second.

13. A system for detecting a critical vehicle event, the system comprising:
    a data acquisition and transfer device disposable in communication with a vehicle computer to receive vehicle speed data and airbag status data from the vehicle computer, the data acquisition and transfer device being operative to derive a change in vehicle speed from the vehicle speed data and generate a critical change signal when the derived change in vehicle speed is above a preset magnitude; and
    a server disposable in communication with the data acquisition and transfer device to receive the airbag status data and the critical change signal therefrom, the server being operative generate a critical event confirmation signal when the hard stop signal is received and airbag status data reveals deployment of the airbag on the vehicle based on a comparison of the airbag status data before the critical change signal is generated and after the critical change signal is generated.

14. The system recited in claim 13, wherein the airbag status data includes a diagnostic trouble code.

15. The system recited in claim 14, wherein the data acquisition and transfer device is capable of receiving vehicle identification information associated with the vehicle for transfer to the server, and the server is capable of determining an airbag status diagnostic trouble code based on the received vehicle identification information.

16. The system recited in claim 15, wherein the server is configured to generate the critical event confirmation signal when the received diagnostic trouble code matches the determined airbag status diagnostic trouble code.

17. The system recited in claim 13, wherein the airbag status data includes parameter id (PID) data.

18. The system recited in claim 17, further wherein the data acquisition and transfer device is capable of receiving vehicle identification information associated with the vehicle for transfer to the server, and the server is capable of determining an airbag status PID based on the received vehicle identification information.

19. The system recited in claim 18, wherein the server is configured to generate the critical event confirmation signal when the received PID matches the determined airbag status PID.

20. A method of detecting a critical vehicle event of a vehicle, the method comprising the steps of:
    determining a change in vehicle speed at a data acquisition and transfer device;
    receiving airbag status data at the remote server;
    comparing, at the remote server, the received airbag status data with stored airbag status data on the remote server to determine whether an airbag on the vehicle has deployed; and
    generating a critical event confirmation signal at the remote server when the determined change in vehicle speed is above a preset magnitude and the comparison of the received airbag status data with the stored airbag status data reveals that the airbag on the vehicle has deployed based on a comparison of the airbag status data generated before the change in vehicle speed is above the preset magnitude and airbag status data generated after the change in vehicle speed is above the preset magnitude.

21. The method recited in claim 20, wherein the determining step includes utilizing an accelerometer on the data acquisition and transfer device.

22. The method recited in claim 20, wherein the determining step includes utilizing vehicle speed data received from the vehicle, and deriving the vehicle deceleration from the vehicle speed data.

23. The method recited in claim 1, further comprising the step of determining the preset magnitude based on vehicle identification information associated with the vehicle.

24. The method recited in claim 1, wherein in the deriving step, the change in vehicle speed is associated with a vehicle deceleration.

25. The method recited in claim 1, wherein in the deriving step, the change in vehicle speed is associated with a vehicle acceleration.

26. A method of detecting a critical vehicle event of a vehicle, the method comprising the steps of:
receiving a plurality of data sets, each data set being associated with a respective operational parameter of the vehicle useful in detecting a critical event of the vehicle and being generated at a respective moment in time;
determining a sequence in which the operational parameters were generated;
determining whether the sequence of the operational parameters associated with the received plurality of data sets conforms to a specific sequence of vehicle operation associated with a critical event; and
generating a critical event indication signal when the sequence of operational parameters associated with the received plurality of data sets conforms to the specific sequence of vehicle operation associated with the critical event.

27. The method recited in claim 26, wherein the plurality of data sets includes a first data set associated with a first operational parameter relating to vehicle deceleration and a second data set associated with a second operational parameter relating to airbag deployment.

28. The method recited in claim 27, wherein the specific sequence of vehicle operation includes vehicle deceleration having a magnitude above a prescribed threshold and followed by airbag deployment.

29. The method as recited in claim 28 wherein the first data set is generated prior to the second data set.

30. The method as recited in claim 29 wherein the sequence in which the first and second data sets were generated indicates that vehicle has likely been involved in an automotive collision.

31. The method as recited in claim 29 wherein the sequence in which the first and second data sets were generated indicates that the vehicle has likely not been involved in an automotive collision.

32. The method as recited in claim 26 wherein the plurality of data sets includes a first data set and a second data set, wherein the first data set is generated prior to the second data set.

33. The method as recited in claim 32 wherein the sequence in which the first and second data sets were generated indicates that vehicle has likely been involved in an automotive collision.

34. The method as recited in claim 32 wherein the sequence in which the first and second data sets were generated indicates that the vehicle has likely not been involved in an automotive collision.

35. The method as recited in claim 26, wherein the step of generating the critical event indication signal occurs at a remote server.

36. The method as recited in claim 26, further comprising the step of displaying an alert on a handheld communication device in response to generation of the critical event indication signal.

37. The method as recited in claim 26, wherein at least one step is implemented on a handheld communication device.

38. The method recited in claim 26, wherein at least one of the plurality of data sets is received from a data acquisition and transfer device configured to interface with an electronic control unit on the vehicle.

39. The method recited in claim 26, further comprising the step of communicating the critical event indication signal to a preprogrammed voicemail address.

40. The method recited in claim 26, further comprising the step of communicating the critical event indication signal to a preprogrammed text message address.

41. The method recited in claim 26, further comprising the step of communicating the critical event indication signal to a preprogrammed electronic mail address.

42. The method recited in claim 26, further comprising the step of communicating the critical event indication signal to an emergency responder.

* * * * *